US008290548B2

(12) United States Patent
Takahashi

(10) Patent No.: US 8,290,548 B2
(45) Date of Patent: Oct. 16, 2012

(54) MOBILE ELECTRONIC DEVICE

(75) Inventor: Shin Takahashi, Yokohama (JP)

(73) Assignee: Kyocera Corporation, Kyoto (JP)

(*) Notice: Subject to any disclaimer, the term of this patent is extended or adjusted under 35 U.S.C. 154(b) by 115 days.

(21) Appl. No.: 12/748,344

(22) Filed: Mar. 26, 2010

(65) Prior Publication Data

US 2010/0248621 A1 Sep. 30, 2010

(30) Foreign Application Priority Data

Mar. 26, 2009 (JP) .................................. 2009-77458

(51) Int. Cl.
*H04M 1/00* (2006.01)

(52) U.S. Cl. ...................... 455/575.3; 455/571; 455/572

(58) Field of Classification Search ................. 455/13.4, 455/39, 127.1, 343.1, 571, 572, 575.3
See application file for complete search history.

(56) References Cited

U.S. PATENT DOCUMENTS 6,839,577 B2 * 1/2005 Krenz et al. ............... 455/575.7
8,060,052 B2 * 11/2011 Kurokawa .................. 455/343.1

FOREIGN PATENT DOCUMENTS

JP 10-084406 3/1998

* cited by examiner

*Primary Examiner* — Tuan H Nguyen

(74) *Attorney, Agent, or Firm* — Duane Morris LLP; Richard C. Kim

(57) ABSTRACT

A system and method for a mobile electronic device operable to receive signals having a plurality of frequencies using an antenna comprising a plurality of conductors is disclosed. A first conductor operable to resonant with a first frequency band is coupled to a second conductor operable to resonant with a second frequency band. The second conductor is coupled to a ground, if the first conductor is coupled to a power supply. The second conductor is coupled to the power supply, if the first conductor is coupled to the ground.

20 Claims, 5 Drawing Sheets

200

300

MOBILE ELECTRONIC DEVICE

CROSS-REFERENCE TO RELATED APPLICATION

The present application claims priority under 35 U.S.C. §119 to Japanese Application No. 2009-077458, filed on Mar. 26, 2009, entitled "MOBILE ELECTRONIC DEVICE". The content of which is incorporated by reference herein in its entirety.

FIELD

Embodiments of the present invention relate generally to mobile electronic devices, and more particularly relate to a mobile electronic device operable to communicate with other devices.

BACKGROUND

Existing mobile electronic devices comprise a first chassis and a second chassis, which can be moved between an opened state and a closed state. In such mobile electronic devices, electric power is supplied to a first conductor located in the first chassis, while a second conductor located in the second chassis is grounded. In this manner, the first conductor and the second conductor can provide an antenna. However, in such mobile electronic devices, the first conductor and the second conductor can provide an antenna based on using a signal comprising a single frequency band for communication. Accordingly, signals comprising a plurality of frequency bands may function less than optimum when using such mobile electronic devices for communication.

Therefore, there is a need for a mobile electronic device operable to receive signals comprising a plurality of frequency bands using an antenna comprising a plurality of conductors.

SUMMARY

A system and method for a mobile electronic device operable to receive signals comprising a plurality of frequency bands using an antenna comprising a plurality of conductors is disclosed. A first conductor operable to resonant with a first frequency band is coupled to a second conductor operable to resonant with a second frequency band. The second conductor is coupled to a ground, if the first conductor is coupled to a power supply. The second conductor is coupled to a power supply, if the first conductor is coupled to the ground.

A first embodiment comprises a mobile electronic device. The mobile electronic device comprises a first conductor, a second conductor, a first circuit and a second circuit. The first circuit comprises a first conductor coupled to the first conductor, a first power supply operable to supply an electric power to the second conductor, and a first wireless circuit coupled to the first power supply. The second circuit comprises a second ground coupled to the second conductor, a second power supply operable to supply an electric power to the first conductor, and a second wireless circuit coupled to the second power supply.

A second embodiment comprises a mobile electronic device. The mobile electronic device comprises a first conductor operable to resonant with a first frequency band, and a second conductor operable to resonant with a second frequency band. The mobile electronic device further comprises a coupler operable to couple the first conductor to the second conductor, and a power supply operable to supply power to one of the first conductor and the second conductor. The mobile electronic device also comprises a ground operable to couple to one of the first conductor and the second conductor, and a control module. The control module is operable to couple the second conductor to the ground, if the first conductor is coupled to the power supply, and couple the second conductor to the power supply, if the first conductor is coupled to the ground.

A third embodiment comprises a method of receiving a multi frequency band signal. The method comprises providing a first conductor operable to resonant with a first frequency band, and providing a second conductor coupled to the first conductor, and operable to resonant with a second frequency band. The method further comprises coupling the second conductor to a ground, if the first conductor is coupled to a power supply, and coupling the second conductor to the power supply, if the first conductor is coupled to the ground.

BRIEF DESCRIPTION OF THE DRAWINGS

Embodiments of the present invention are hereinafter described in conjunction with the following figures, wherein like numerals denote like elements. The figures are provided for illustration and depict exemplary embodiments of the present invention. The figures are provided to facilitate understanding of the present invention without limiting the breadth, scope, scale, or applicability of the present invention. The drawings are not necessarily made to scale.

DETAILED DESCRIPTION OF EXEMPLARY EMBODIMENTS

The following description is presented to enable a person of ordinary skill in the art to make and use the embodiments of the invention. The following detailed description is exemplary in nature and is not intended to limit the invention or the application and uses of the embodiments of the invention. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the invention. Furthermore, there is no intention to be bound by any expressed or implied theory presented in the preceding technical field, background, brief summary or the following detailed description. The present invention should be accorded scope consistent with the claims, and not limited to the examples described and shown herein.

Embodiments of the invention are described herein in the context of one practical non-limiting application, namely, a mobile phone. Embodiments of the invention, however, are not limited to such mobile phones, and the techniques described herein may also be utilized in other applications. For example, embodiments may be applicable to digital cameras, electronic game machines, digital music players, personal digital assistance (PDA), personal handy phone system (PHS), lap top computers, and the like.

As would be apparent to one of ordinary skill in the art after reading this description, these are merely examples and the embodiments of the invention are not limited to operating in accordance with these examples. Other embodiments may be utilized and structural changes may be made without departing from the scope of the exemplary embodiments of the present invention.

Figure 1:
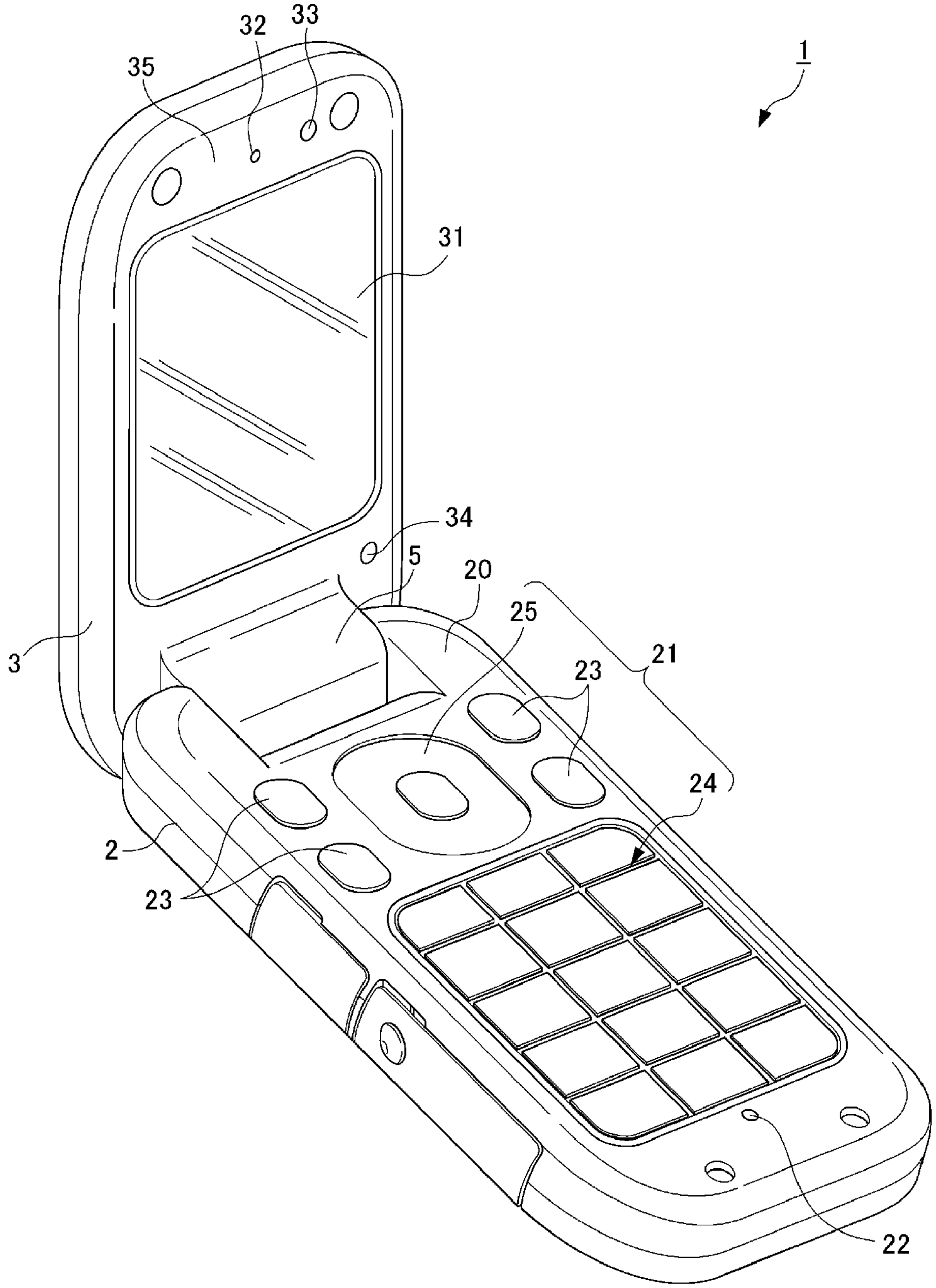
FIG. 1 is an illustration of an electronic mobile electronic device according to an embodiment of the invention.

FIG. 1 is an illustration an electronic mobile electronic device 1 according to a first embodiment of the invention. The mobile phone device 1 comprises a first chassis 2 (manipulation-unit-side chassis) and a second chassis 3 (display-unit-side chassis). The first chassis 2 comprises a surface 20, a manipulation key group 21, and a microphone 22 to which sound is input. The manipulation key group 21 and the microphone 22 may be located on the surface 20. The manipulation key group 21 comprises a function setting manipulation button 23, an input manipulation button 24, and a determination manipulation button 25. The function setting manipulation button 23 operates various functions, such as but without limitation, various settings, a telephone directory function, a mailing function, and the like. The input manipulation button 24 inputs numeric characters of a telephone or characters of an e-mail. The determination manipulation button 25 makes a determination in various manipulations and performs scrolling.

The second chassis 3 comprises a surface 35, a display 31, a sound output 32, an imaging 33, and a speaker 34. The display 31, the sound output 32, the imaging 33, and the speaker 34 may be located on the surface 35.

Various information may be displayed on the display 31. The sound output 32, outputs sound from, for example but without limitation, a conversation of a caller, and the like. The imaging 33 comprises a charge coupled devices (CCD) camera and the like to image a subject. The speaker 34 outputs, for example but without limitation, music, and the like.

The first chassis 2 and the second chassis 3 are coupled to each other by a hinge mechanism 5, and the first chassis 2 and the second chassis 3 can rotate relative to each other. In this manner, the first chassis 2 and the second chassis 3 can be moved between a state in which the first chassis 2 and the second chassis 3 are opened with respect to each other (opened state) as shown in FIG. 1, and a state in which the first chassis 2 and the second chassis 3 are folded (closed state, not shown in FIG. 1).

In the embodiment shown in FIG. 1, the electronic mobile electronic device 1 is a folding type mobile phone device. However, the electronic mobile electronic device 1 may be, for example but without limitation, a sliding type mobile phone device the first chassis and second chassis overlapping each other is slid in one direction, a turn type mobile phone device in which one of the first chassis and second chassis is turned about an axis along an overlapping direction of the first chassis and second chassis, and the like.

Figure 2:
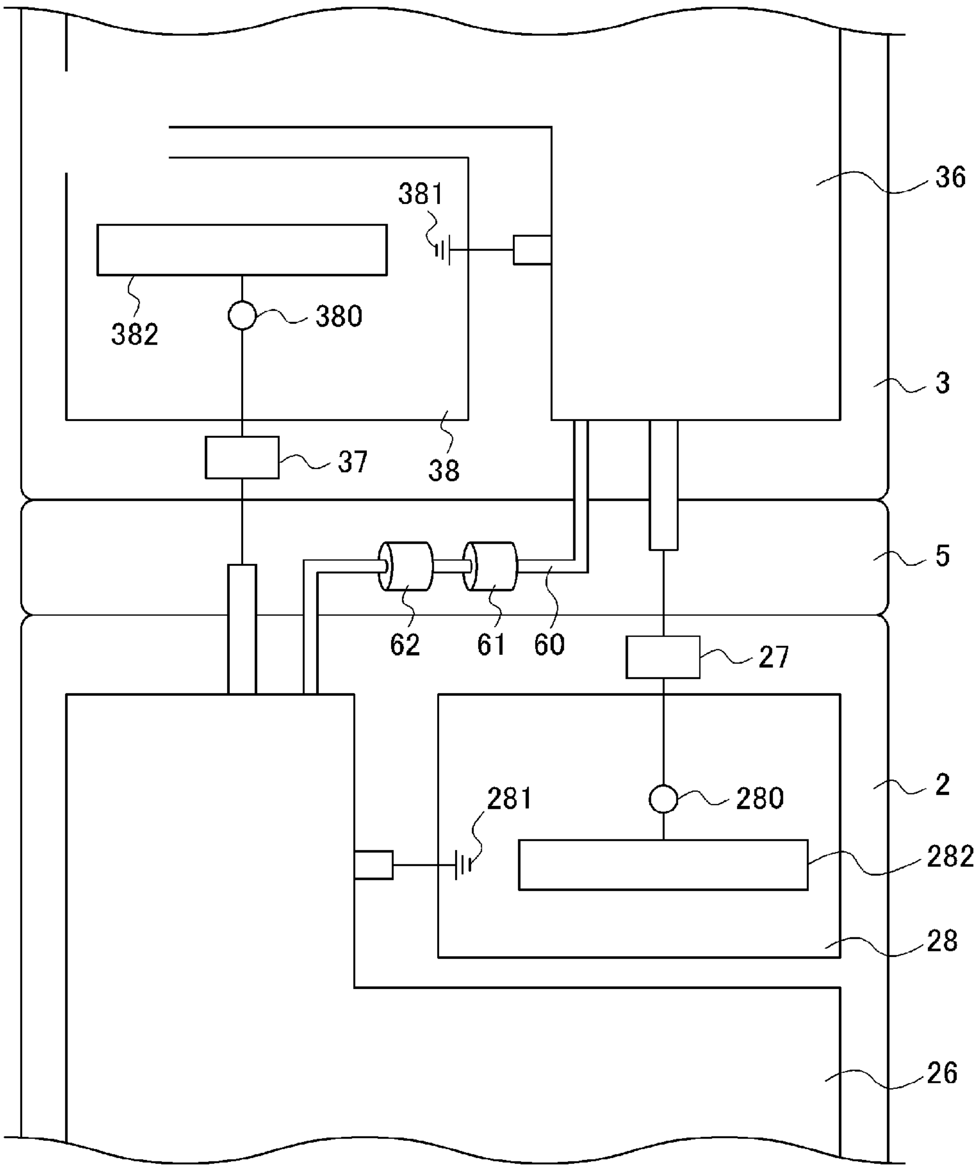
FIG. 2 is an illustration of a schematic functional block diagram of an electronic mobile electronic device according to an embodiment of the invention.
Figure 3:
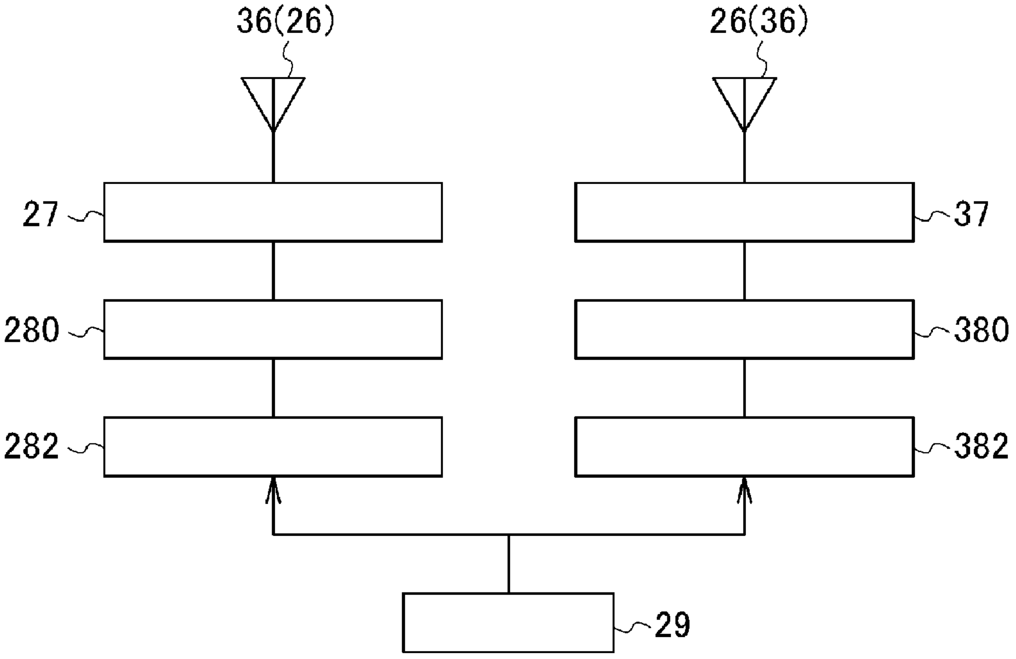
FIG. 3 is an illustration of a schematic functional block diagram of an electronic mobile electronic device according to an embodiment of the invention.

FIG. 2 is an illustration of a schematic functional block diagram 200 (system 200) of an electronic mobile electronic device according to an embodiment of the invention. FIG. 3 is an illustration of a schematic functional block diagram 300 (system 300) of an electronic mobile electronic device according to an embodiment of the invention.

The first chassis 2 comprises a first conductor 26, a first filter 27, a first circuit 28, and a control module 29 (FIG. 3).

The first conductor 26 may be a ground pattern on a first circuit board (not shown). Alternatively, for example, the first conductor 26 may be a shielding case or a conductor member constituting the first chassis 2. The first conductor 26 resonates, for example but without limitation, with a second signal (revived signal) having a frequency band of 800 MHz. However, signals having other frequency bands, for example but without limitation, a signal having a frequency band used in CDMA communication. A signal having a frequency band used to receive digital broadcast, and the like, may also be used as the received signal. According to one embodiment, the second signal can be used for telephone call signal.

The first filter 27 attenuates passage of the signal resonating with the first conductor 26. The first filter 27 may be located between the first circuit 28 and a second conductor 36. Specifically the first filter 27 may be located between the second conductor 36 and a first wireless circuit 282. Alternatively, the first filter 27 may be located between, for example but without limitation, the second conductor 36 and the first power supply 280, the first power supply 280 and the first wireless circuit 282, the first conductor 26 and the first circuit 28, the first conductor 26 and the first ground 281, and the like. The first filter units 27 may comprise a plurality of filters.

The first circuit 28 is coupled to the first conductor 26 and the second conductor 36. The first circuit 28 comprises a first power supply 280, a first ground 281, and the first wireless circuit 282. The first circuit 28 is located in the first chassis 2 in this example. Alternatively, the first circuit 28 may be located in the second chassis 3.

The first power supply 280 supplies electric power to the second conductor 36 through the first filter 27.

The first ground 281 is coupled to the first conductor 26.

The first wireless circuit 282 is coupled to the first power supply 280 and performs signal processing on a first signal to generate data.

The control module 29 is coupled to the first circuit 28 and a second circuit 38 and controls the first circuit 28 and the second circuit 38.

The second chassis 3 comprises a second conductor 36, a second filter 37, and a second circuit 38.

The second conductor 36 is located in the second chassis 3, and the second conductor 36 may be a ground pattern of a second circuit board (not shown). Alternatively, for example, the second conductor 26 may be a shielding case or a conductor member constituting the first chassis 2. The second conductor 36 resonates with a signal having a frequency band of 2 GHz generating the first received signal. However, signals having other frequency bands, for example but without limitation, a signal having a frequency band used in CDMA communication. A signal having a frequency band used to receive digital broadcast, and the like may also be used as the first received signal. The first signal can be used for e-mail processing.

Communication through the first antenna and the second antenna are not limited to a simultaneous communication. For example, the communication through the first antenna and the second antenna may individually be conducted, or the communication through the first antenna and the second antenna may comprise signal reception and signal transmission.

The second filter 37 attenuates passage of the signal resonating with the second conductor 36. The second filter 37 may be located between the second circuit 38 and a first conductor 26. Specifically, the second filter 37 may be located between the first conductor 26 and a first wireless circuit 382. Alternatively, the second filter 37 may be located between, for example but without limitation, the first conductor 26 and the second wireless circuit 382. Alternatively, the second filter 37 may be located between, for example but without limitation, the first conductor 26 and the second power supply 380, or the second power supply 380 and the second wireless circuit 382 the second conductor 36 and the second circuit 38, the second conductor 36 and the second ground 381, and the like. The second filter 37 may comprise a plurality of filters.

The second circuit 38 is coupled to the first conductor 26 and the second conductor 36. The second circuit 38 comprises a second power supply 380, a second ground 381, and the second wireless circuit 382. The second circuit 38 is located in the second chassis 3 in this example. Alternatively, the second circuit 38 may be located in the first chassis 2, or may be collocated with the first circuit 28 in the same chassis such as the first chassis 2 or second chassis 3.

The second power supply 380 supplies electric power to the first conductor 26 through the second filter 37.

The second wireless circuit 382 is coupled to the second power supply 380 and performs signal processing on the second signal to generate data.

The first conductor 26 and the second conductor 36 are electrically coupled by a signal line 60 passing through the hinge mechanism 5 (not shown). A third filter 61 and a fourth filter 62 are coupled to the signal line 60. The third filter 61 attenuates the passage of the signal resonating with the first conductor 26. The fourth filter 62 attenuates the passage of the signal resonating with the second conductor 36.

The first power supply 280 supplies the electric power to the second conductor 36, and the second conductor 36 acts as a radiation element of the first antenna. The first conductor 26 is coupled to the first ground 281 to act as a ground of the first antenna. Therefore, the first conductor 26 and the second conductor 36 form the first antenna (chassis dipole antenna) for transmitting and receiving communication signals.

In this manner, the mobile phone device 1 receives a signal (received signal) resonating with the second conductor 36 through the first antenna. The first wireless circuit 282 performs signal processing to the received signal (received through the first antenna) to generate data suitable to perform communication. The data may be used by the control module 29, for example but without limitation, for e-mail processing, and the like.

The second power supply 380 supplies the electric power to the first conductor 26. In this manner, the first conductor 26 is utilized as a radiation element of a second antenna. The second conductor 36 is coupled to the second ground 381 to act as a ground of the second antenna. Therefore, the first conductor 26 and the second conductor 36 form the first antenna (chassis dipole antenna) for transmitting and receiving the communication signals.

In this manner, the mobile phone device 1 receives the signal (received signal) resonating with the first conductor 26 through the second antenna. The second wireless circuit 382 performs signal processing to the received signal to generate data suitable to perform communication. The data may be used by the control module 29 for, for example but without limitation, e-mail processing, and the like.

The second filter 37 attenuates the passage of the signal, received through the first antenna, to the second circuit 38. The fourth filter 62 attenuates the passage of the signal, received through the first antenna, to the second chassis 3.

On the other hand, the first filter 27 attenuates the passage of the signal, received through the second antenna, to the first circuit 28. The third filter 61 attenuates the passage of the signal, received through the second antenna, to the first chassis 2.

In this manner, the mobile phone device 1 can conduct communication through the first antenna and the second antenna using signals having different frequency bands. The fourth filter 62 coupled to the signal line 60 attenuates the passage of the signal, received through the first antenna, to the second chassis 3. The third filter 61 coupled to the signal line 60 attenuates the passage of the signal, received through the second antenna, to the first chassis 2. As a result, signal transmission between the first conductor 26 and the second conductor 36 through the signal line 60 is blocked.

As described above, the first power supply 280 supplies the electric power to the second conductor 36, and the first ground 281 couples the first conductor 26 to the ground. That is, the second conductor 36 acts as the radiation element of the first antenna, and the first conductor 26 acts as the ground of the first antenna. Therefore, the first conductor 26 and the second conductor 36 act as the first antenna operable to receive the first signal.

On the other hand, the second power supply 380 supplies the electric power to the first conductor 26, and the second ground 381 couples the second conductor 36 to the ground. That is, the first conductor 26 acts as the radiation element of the second antenna, and the second conductor 36 acts as the ground of the second antenna. Therefore, the first conductor 26 and the second conductor 36 act as the second antenna operable to receive the second signal.

The first antenna and the second antenna both comprise the first conductor 26 and the second conductor 36 and are operable to receive and transmit signals having a plurality of frequency bands.

The first filter 27 and the second filter 37 reduce interference between signals received through the first antenna and the second antenna. The interference reduces a gain of each of the first antenna and the second antenna, and thus reducing interference improves gain.

The first filter 27 and the second filter 37 may be located corresponding to the first antenna and the second antenna. Alternatively, either or both of the first filter 27 and the second filter 37 may be optional.

The third filter 61 and the fourth filter 62 are coupled to the signal line 60. Therefore, the third filter 61 attenuates the passage of the signal that interferes with the signal received through the first antenna. The fourth filter 62 attenuates the passage of the signal that interferes with the signal received through the second antenna. Accordingly, gain reductions in the first antenna and second antenna caused by interference may be reduced. One of the third filter 61 and the fourth filter 62 may be coupled to the signal line 60.

The third filter 61 and the fourth filter 62 may be optional.

A frequency band of the signal with which the second conductor 36 resonates may be lower than the frequency band of the signal with which the first conductor 26 resonates.

Therefore, even if a user's hand covers the first chassis 2 (e.g., during a telephone call), a decrease in antenna gain caused by the user's hand blocking a signal may be reduced by receiving a signal from a side of the first chassis 2, where gain loss is small.

In the embodiments shown in FIGS. 2-3, the radiation element (first conductor 26 when electrically powered) of the second antenna resonates with a lower frequency band signal. Alternatively, in one embodiment, determination of which radiation element of the first or second antenna receives a signal having the lower frequency band may be made based on a mode of usage of the mobile phone device. For example, the radiation element (second conductor 26 when electrically powered) of the first antenna can be selected to resonate with a lower frequency band signal instead.

Figure 4:
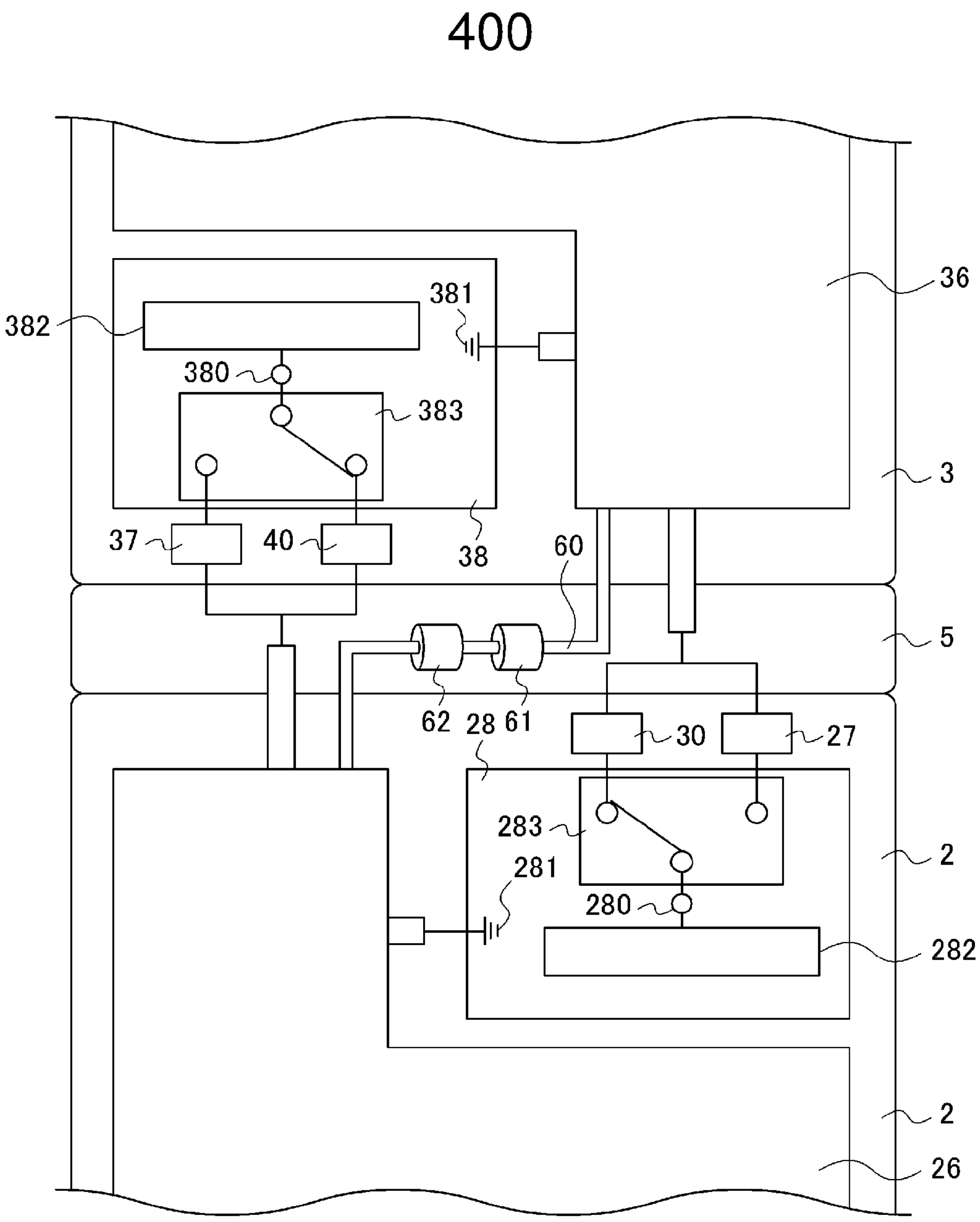
FIG. 4 is an illustration of a schematic functional block diagram of an electronic mobile electronic device according to an embodiment of the invention.
Figure 5:
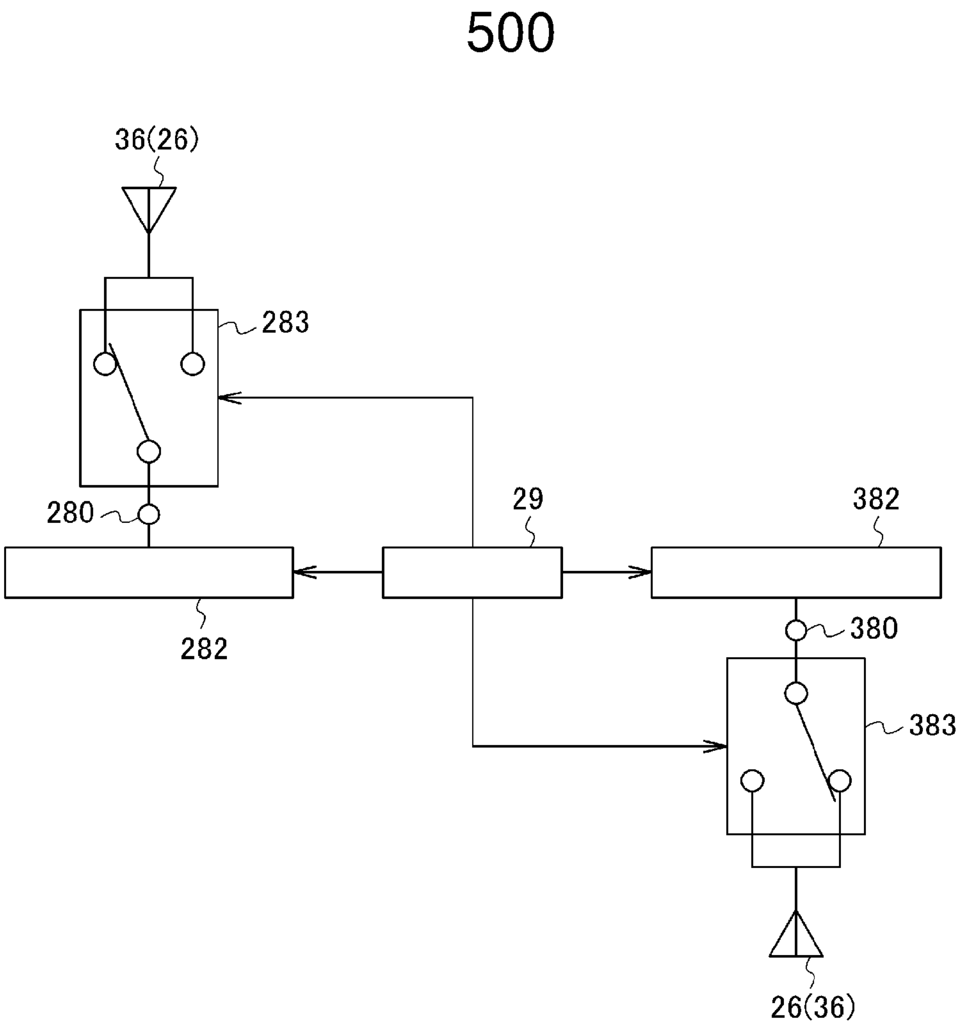
FIG. 5 is an illustration of a schematic functional block diagram of an electronic mobile electronic device according to an embodiment of the invention.

FIG. 4 is an illustration of a schematic functional block diagram 400 (system 400) of an electronic mobile electronic device according to an embodiment of the invention. FIG. 5 is an illustration of a schematic functional block diagram 500 (system 500) of an electronic mobile electronic device according to an embodiment of the invention.

The systems 400-500 may have functions, material, and structures that are similar to the mobile electronic device 100 and systems 200-300. Therefore common features, functions, and elements may not be redundantly described here.

The control module 29 selects one of two filter units. The circuit is coupled to the selected filter unit.

System 400 comprises a fifth filter 30 on a side of the first chassis 2. The fifth filter 30 is located between the second conductor 36 and the first wireless circuit 282. The fifth filter 30 is coupled to a first switch 283 as described in more detail below. The fifth filter 30 attenuates the passage of the signal that interferes with the second signal. In one embodiment, the first filter 27 attenuates the passage of the signal that interferes with the first signal.

The first circuit 28 is located on a side of the first chassis 2 and comprises the first switch 283. The first switch 283 is coupled to the first wireless circuit 282. Additionally the control module 29 performs switching control of the first switch 283 to couple one of the first filter 27 and the fifth filter 30 to the first wireless circuit 282.

A sixth filter 40 is located on a side of the second chassis 3. The sixth filter 40 is located between the first conductor 26 and the second wireless circuit 382. The sixth filter 40 is coupled to a second switch 383. The sixth filter 40 attenuates the passage of the signal that interferes with the first signal. In one embodiment, the second filter 37 attenuates the passage of the signal that interferes with the second signal.

The second circuit 38 located on the side of the second chassis 3 comprises the second switch 383. The second switch 383 is coupled to the second wireless circuit 382. Additionally the control module 29 performs switching control of the second switch 383, to couple one of the second filter 37 and the sixth filter 40 to the second wireless circuit 382.

The control module 29 controls the first switch 283 and the second switch 383 to switch between a first state and a second state. In the first state, the first switch 283 selects the first filter 27, and the second switch 383 selects the second filter 37. In the second state, the first switch 283 selects the fifth filter 30, and the second switch 383 selects a sixth filter 40.

The first conductor 26 and the second conductor 36 resonate with the signals having frequency bands comprising the signal having the frequency band of 2 GHz that becomes the first signal and the signal having the frequency band of 800 MHz that becomes the second signal.

When the control module 29 selects the first state, the first power supply 280 and the second conductor 36 are coupled, and the first ground 281 and the first conductor 26 are coupled forming the first antenna. In the first state, the second conductor 36 acts as the radiation element of the first antenna, and the first conductor 26 acts as the first ground of the antenna. That is, the first conductor 26 and the second conductor 36 constitute one antenna (dipole antenna) to receive and transmit the signal.

When the control module 29 selects the second state, the second power supply 380 and the first conductor 26 are coupled, and the second ground 381 and the second conductor 36 are coupled forming the second antenna. In the second state, the first conductor 26 acts as the radiation element of the second antenna, and the second conductor 36 acts as the first ground of the antenna. That is, the first conductor 26 and the second conductor 36 constitute an antenna (dipole antenna) to receive and transmit the signal.

The first filter 27 attenuates the passage of the first signal. The first conductor 26 resonates with the first signal, and the first signal is received through the second antenna, thereby attenuating the interference of the first signal received through the first antenna and the first signal received through the second antenna. The first wireless circuit 282 performs signal processing to the first signal received through the first antenna, to generate suitable data to be utilized for, for example but without limitation, processing the e-mail, and the like.

The second filter 37 attenuates the passage of the second signal. The second filter 37 resonates with the second conductor 36, and the second signal is received through the first antenna, thereby attenuating the interference of the second signal received through the first antenna and the second signal received through the second antenna. The second wireless circuit 382 performs signal processing to the second signal to generate suitable data to be utilized for, for example but without limitation, processing the e-mail, and the like.

As described above, the mobile phone device 1 simultaneously receives the signals having different frequencies through the first antenna and the second antenna. At this point, the fourth filter coupled to the signal line 60 attenuates the passage of the signal received through the first antenna to the second chassis 3. The third filter coupled to the signal line 60 attenuates the passage of the signal received through the second antenna to the first chassis 2. As a result, the amount of signal transmission between the first conductor 26 and the second conductor 36 through the signal line 60 is decreased.

When the control module 29 selects the second state, the first power supply 280 and the second conductor 36 are coupled, and the first ground 281 and the first conductor 26 are coupled. Therefore, the second conductor 36 acts as the radiation element of the first antenna, and the first conductor 26 acts as the first ground of the antenna. That is, the first conductor 26 and the second conductor 36 constitute one antenna (dipole antenna) to receive and transmit the signal.

The second power supply 380 is coupled to the first conductor 26, and the second ground 381 is coupled to the second conductor 36. That is, the first conductor 26 acts as the radiation element of the second antenna, and the second conductor 36 acts as the ground of the antenna. Therefore, the first conductor 26 and the second conductor 36 act as an antenna to be able to receive the first signal.

The fifth filter 30 attenuates the passage of the second signal. The fifth filter 30 resonates with the first conductor 26, and the second signal is received through the second antenna, thereby attenuating the interference of the second signal received through the first antenna and the second signal received through the second antenna. The first wireless circuit 282 performs signal processing to the second signal received through the first antenna, to generate suitable data to be utilized, for example for, processing the email, and the like.

In one embodiment, the fifth filter 30 is located between the second conductor 36 and the first wireless circuit 282. Alternatively, the fifth filter 30 may be located between the second conductor 36 and the first power supply 280, or between the first power supply 280 and the first wireless circuit 282. The fifth filter 30 may be located between the first conductor 26 and the first circuit 28. Specifically the first filter 27 may be located between the first conductor 26 and the first ground 281. A plurality of fifth filter units 30 may exist at the various locations.

The sixth filter 40 attenuates the passage of the first signal. The second conductor 36 resonates with the first signal, and the first signal is received through the first antenna, thereby attenuating the interference of the first signal received through the first antenna and the first signal received through the second antenna. The second wireless circuit 382 performs signal processing to the first signal received through the first antenna, to generate suitable data to be utilized, for example for, processing the e-mail, and the like.

In one embodiment, the sixth filter 40 is located between the first conductor 26 and the second wireless circuit 382. Alternatively, the sixth filter 40 may be located between the first conductor 26 and the second power supply 380, or between the second power supply 380 and the second wireless circuit 382. The sixth filter 40 may be located between the second conductor 36 and the second circuit 38. Specifically the sixth filter 40 may be located between the second conductor 36 and the second ground 381. The sixth filter units 40 may comprise a plurality of filter units in the positions.

The control module 29 is operable to switch between the frequencies of the signal received from the radiation element of the first antenna and the signal received from the radiation element of the second antenna. Therefore, the frequency band of the received signal is set based on the usage state or the gain state of the mobile electronic device, so that the signal can be received in good condition.

In one embodiment, the fifth filter 30 and the sixth filter 40 are located corresponding to the first antenna and the second antenna. Alternatively, one of the fifth filter 30 and the sixth filter 40 may be located.

The fifth filter 30 and the sixth filter 40 may be optional.

While at least one exemplary embodiment has been presented in the foregoing detailed description, the present invention is not limited to the above-described embodiment or embodiments. Variations may be apparent to those skilled in the art. In carrying out the present invention, various modifications, combinations, sub-combinations and alterations may occur in regard to the elements of the above-described embodiment insofar as they are within the technical scope of the present invention or the equivalents thereof. The exemplary embodiment or exemplary embodiments are examples, and are not intended to limit the scope, applicability, or configuration of the invention in any way. Rather, the foregoing detailed description will provide those skilled in the art with a template for implementing the exemplary embodiment or exemplary embodiments. It should be understood that various changes can be made in the function and arrangement of elements without departing from the scope of the invention as set forth in the appended claims and the legal equivalents thereof. Furthermore, although embodiments of the present invention have been described with reference to the accompanying drawings, it is to be noted that changes and modifications may be apparent to those skilled in the art. Such changes and modifications are to be understood as being comprised within the scope of the present invention as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile electronic device comprising:
- a first conductor;
- a second conductor;
- a first circuit comprising:
  - a first ground coupled to the first conductor, thereby forming a first antenna;
  - a first power supply configured to supply an electric power to the second conductor; and
  - a first wireless circuit coupled to the first power supply and configured to transmit and receive signals using the first antenna; and
- a second circuit comprising:
  - a second ground coupled to the second conductor, thereby forming a second antenna;
  - a second power supply configured to supply an electric power to the first conductor; and
  - a second wireless circuit coupled to the second power supply and configured to transmit and receive signals using the second antenna.

2. The mobile electronic device according to claim 1, further comprising:
- a first chassis comprising the first conductor therein; and
- a second chassis comprising the second conductor therein.

3. The mobile electronic device according to claim 2, further comprising a control module provided in one of the first chassis and the second chassis.

4. The mobile electronic device according to claim 2, further comprising:
- a control module in one of the first chassis and the second chassis;
- a first filter that is coupled to at least one of a space between the first conductor and the first ground, and a space between the second conductor and the first wireless circuit, and attenuates passage of a signal having a frequency at which the first conductor resonates;
- a second filter that is coupled at least one of a space between the second conductor and the second ground, and a space between the first conductor and the second wireless circuit, and attenuate passage of a signal having a frequency at which the second conductor resonates;
- a third filter that is coupled to at least one of a space between the first conductor and the first ground, and a space between the second conductor and the first wireless circuit , and attenuates passage of a signal having a frequency at which the first conductor resonates; and
- a fourth filter that is coupled to at least one of a space between the second conductor and the second ground, and a space between the first conductor and the second wireless circuit, and attenuates passage of signal having a frequency at which the second conductor resonates, wherein the first circuit includes a first switch that connects one of the first filter and the third filter to the first wireless circuit, the second circuit includes a second switch that connects one of the second filter and the fourth filter to the second wireless circuit, and the control module controls switching between the first switch and the second switch such that a first state and a second state are realized, the first filter being coupled to the first wireless circuit while the second filter is coupled to the second wireless circuit in the first state, the third filter being coupled to the first wireless circuit while the fourth filter is coupled to the second wireless circuit in the second state.

5. The mobile electronic device according to claim 4, wherein a first antenna is formed in the first state and a second antenna is formed in the second state.

6. The mobile electronic device according to claim 1, further comprising a first filter operable to attenuate passage of a signal having a frequency at which the first conductor resonates.

7. The mobile electronic device according to claim 6, wherein the first filter is coupled to at least one of:

a space between the first conductor and the first ground; and a space between the second conductor and the first wireless circuit.

8. The mobile electronic device according to claim 6, further comprising a second filter operable to attenuate passage of a signal having a frequency at which the second conductor resonates.

9. The mobile electronic device according to claim 8, wherein the second filter is coupled to at least one of a space between the second conductor and the second ground; and a space between the first conductor and the second wireless circuit.

10. The mobile electronic device according to claim 8, further comprising:

a third filter for filtering a signal having a frequency at which the first conductor resonates;

a fourth filter for filtering a signal having a frequency at which the second conductor resonates; and a signal line coupled to the first circuit and the second circuit and coupled to at least one of the third filter and the fourth filter.

11. The mobile electronic device according to claim 10, further comprising a fifth filter operable to attenuate passage of a signal having a frequency at which the first conductor resonates, wherein the fifth filter is coupled to at least one of:

a space between the first conductor and the first ground; and a space between the second conductor and the first wireless circuit.

12. The mobile electronic device according to claim 11, wherein the first circuit comprises a first switch operable to connect one of the first filter and the fifth filter to the first wireless circuit.

13. The mobile electronic device according to claim 11, further comprising a sixth filter operable to attenuate passage of a signal having a frequency at which the second conductor resonates, wherein the sixth filter is coupled to at least one of:

a space between the second conductor and the second ground; and a space between the first conductor and the second wireless circuit.

14. The mobile electronic device according to claim 13, wherein:

the second circuit comprises a second switch operable to connect one of the second filter and the sixth filter to the second wireless circuit.

15. The mobile electronic device according to claim 1, wherein a frequency at which the second conductor resonates is lower than a frequency at which the first conductor resonates.

16. The mobile electronic device according to claim 1, wherein the first conductor will resonate at a lower or higher frequency than the second conductor depending on a mode of usage of the mobile electronic device.

17. A mobile electronic device, comprising:

a first conductor configured to resonate at a first frequency;

a second conductor configured to resonate at a second frequency;

a coupler operable to couple the first conductor to the second conductor;

a power supply configured to supply power to one of the first conductor and the second conductor;

a ground configured to be coupled to one of the first conductor and the second conductor; and a control module configured to:

couple the second conductor to the ground, if the first conductor is coupled to the power supply; and couple the second conductor to the power supply, if the first conductor is coupled to the ground.

18. The mobile electronic device according to claim 17, wherein a frequency of a signal at which the second conductor resonates is lower than a frequency of the signal at which the first conductor resonates.

19. A method of receiving a multi frequency band signal, the method comprising:

providing a first conductor configured to resonate at a first frequency;

providing a second conductor coupled to the first conductor, and configured to resonate at a second frequency;

coupling the second conductor to a ground, if the first conductor is coupled to a power supply; and coupling the second conductor to the power supply, if the first conductor is coupled to the ground.

20. The method according to claim 19, wherein a frequency of a signal at which the second conductor resonates is lower than a frequency of the signal at which the first conductor resonates.

* * * * *